INVENTOR.
Robert J. Teitel
BY
Edward E. Schilling
AGENT

INVENTOR.
Robert J. Teitel
BY
Edward E. Schilling
AGENT

INVENTOR.
Robert J. Teitel
BY
Edward E. Schilling
AGENT

May 17, 1966  R. J. TEITEL  3,251,745
NUCLEAR REACTOR AND INTEGRATED
FUEL-BLANKET SYSTEM THEREFOR
Filed Dec. 11, 1961  10 Sheets-Sheet 6

INVENTOR.
Robert J. Teitel
BY
Edward E. Schilling
AGENT

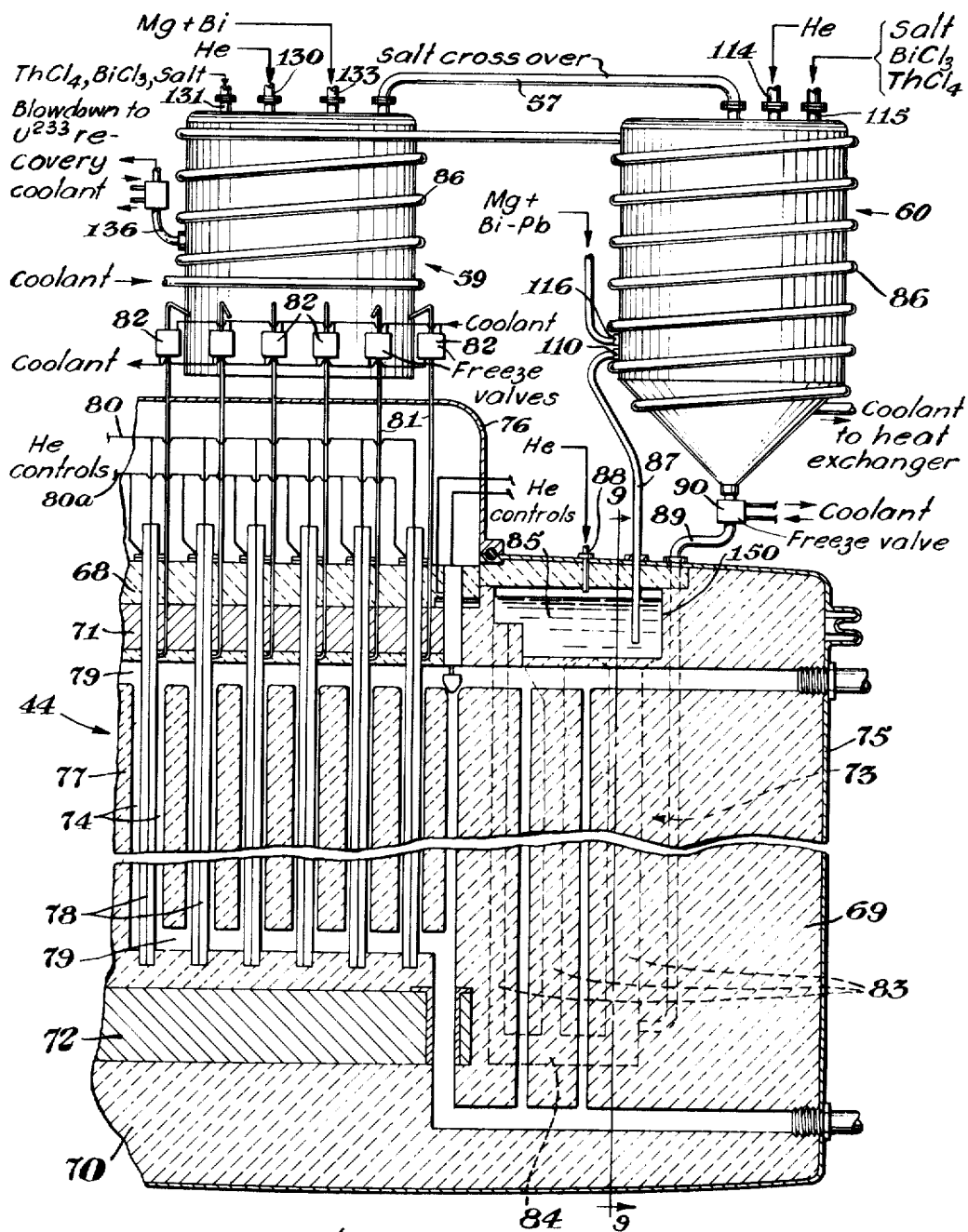

INVENTOR.
Robert J. Teitel
BY
Edward E. Schilling
AGENT

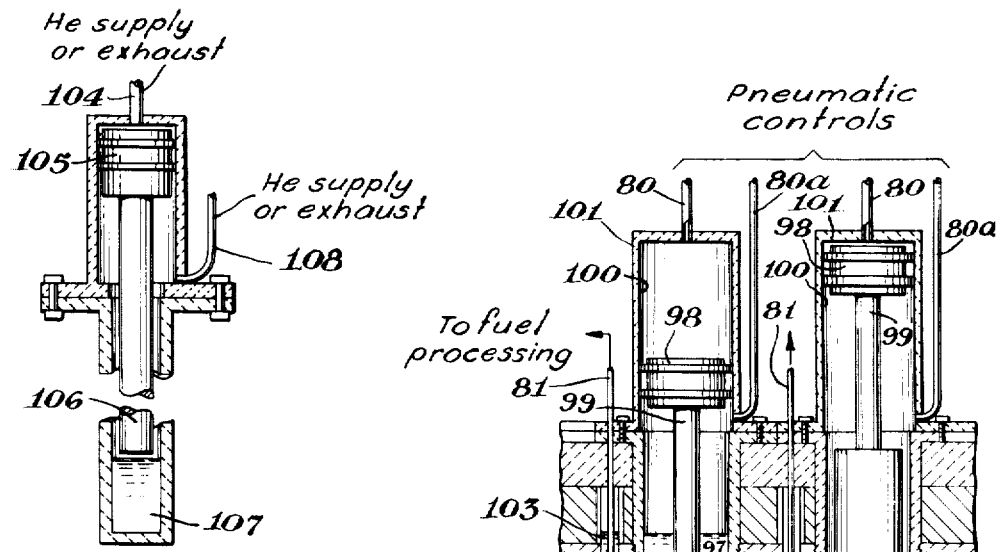
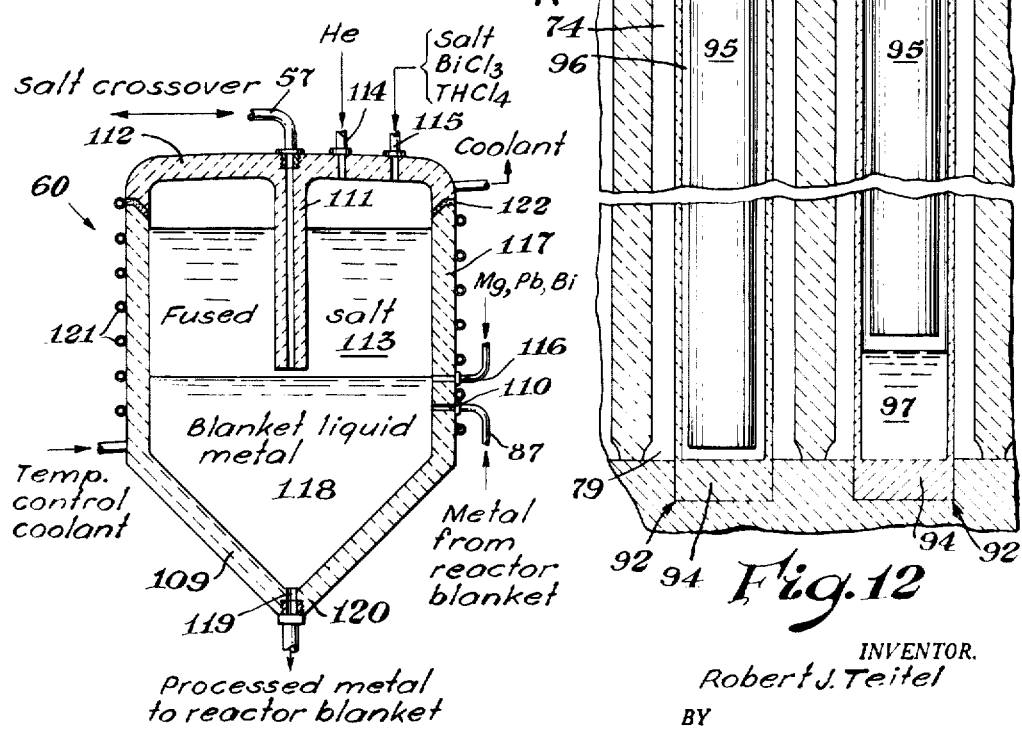

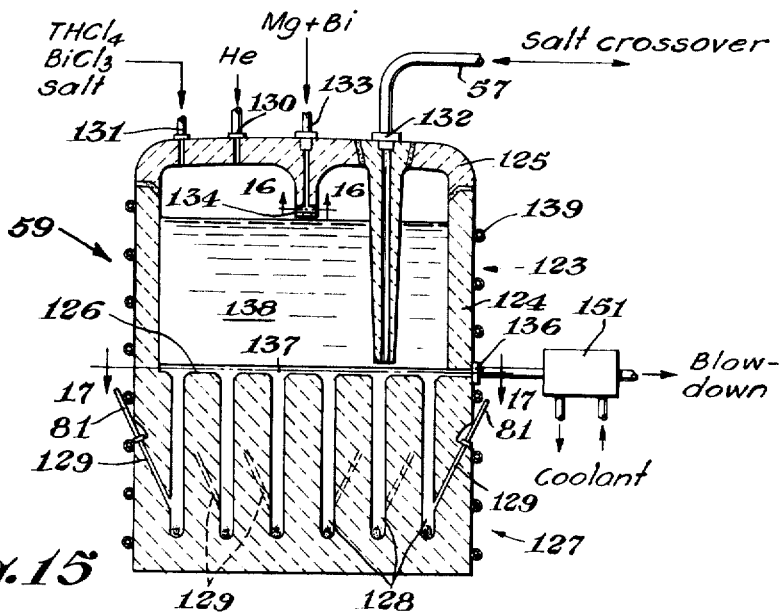
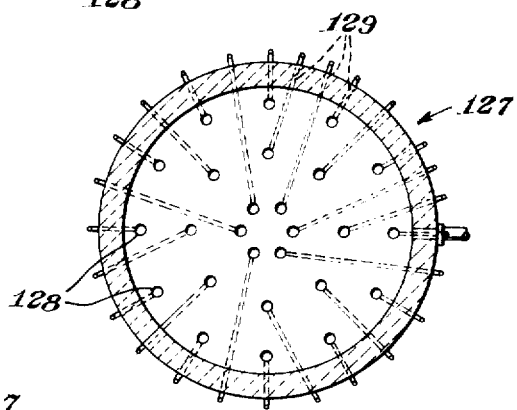
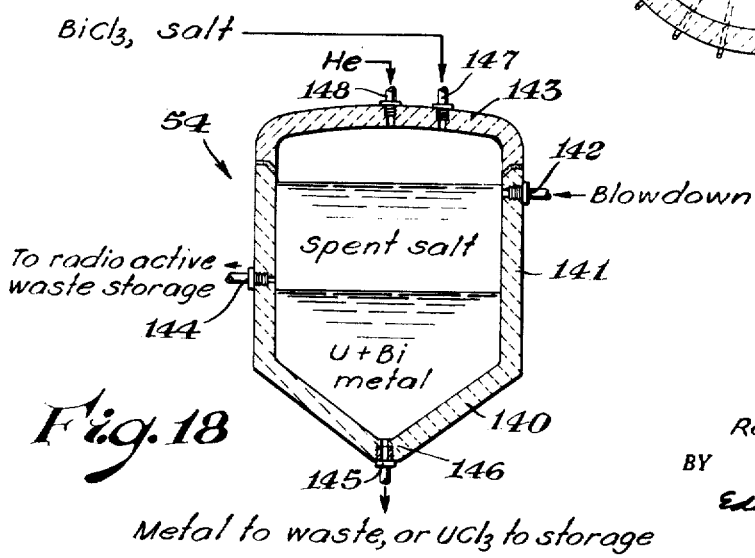

United States Patent Office 3,251,745
Patented May 17, 1966

3,251,745
NUCLEAR REACTOR AND INTEGRATED FUEL-BLANKET SYSTEM THEREFOR
Robert J. Teitel, Northridge, Calif., assignor to The Dow Chemical Company, Midland, Mich., a corporation of Delaware
Filed Dec. 11, 1961, Ser. No. 158,412
8 Claims. (Cl. 176—14)

The invention relates to an improved type of nuclear reactor and more particularly relates to an improved type of liquid metal fuel reactor and an integrated fuel and blanket system therefor.

Nuclear reactors heretofore proposed have generally suffered from the disadvantage that they are inherently subject to a nuclear accident in the event of a power failure or mechanical failure in either the apparatus which positions the control rods or the apparatus which positions the fuel. The reactors have also generally suffered the disadvantage that the fuel employed therein needs to be completely removed from the environs of the reactor periodically and processed to remove deleterious fission products, and the fuel element refabricated, thus necessitating the substitution of other fuel during a protracted processing period.

It is, therefore, an object of the invention to overcome some of the difficulties inherent in previous nuclear reactors and reactor fuel cycles.

Another object of the invention is to provide a nuclear reactor which is not subject to nuclear accident in the event of power failure or mechanical failure.

Another object of the invention is to provide a nuclear reactor employing fuel which is readily processed at the reactor site.

Still a further object of the invention is to provide a reactor in which fertile material is converted, i.e., bred, to fissionable material.

Still another object of the invention is to provide an integrated fuel-blanket processing system whereby fissionable material formed in the blanket is transferred promptly and efficiently to the fuel system.

Yet another object of the invention is to provide a nuclear fuel processing system whereby nuclear fuel is processed at the reactor site and returned to the core region, minimizing the inventory of nuclear fuel required.

These and other objects and advantages of the present invention will be more clearly understood on becoming familiar with the following description and claims and the appended drawings in which:

FIG. 8 is a fragmentary vertical sectional view of a reactor taken along the line 8—8 of FIG. 4, showing only parts of one sector of the cylindrically shaped reactor, the pneumatic lines and some of the coolant lines to freeze valves being shown schematically;

FIG. 12 is a fragmentary vertical sectional view of the core region and the blanket and reflector regions thereabove, showing the relation of fuel elements to the coolant passages in the core block;

FIG. 13 illustrates in vertical section a suitable type of liquid metal control element;

FIG. 14 is a vertical sectional view of a blanket processing vessel which may be used in the process of the invention;

FIG. 15 is a vertical sectional view of a fuel processing vessel;

FIG. 16 is a sectional view along line 16—16 of FIG. 15 showing a diffuser element for delivering and spreading an influx of salt in the fuel processing vessel;

Figure 1:
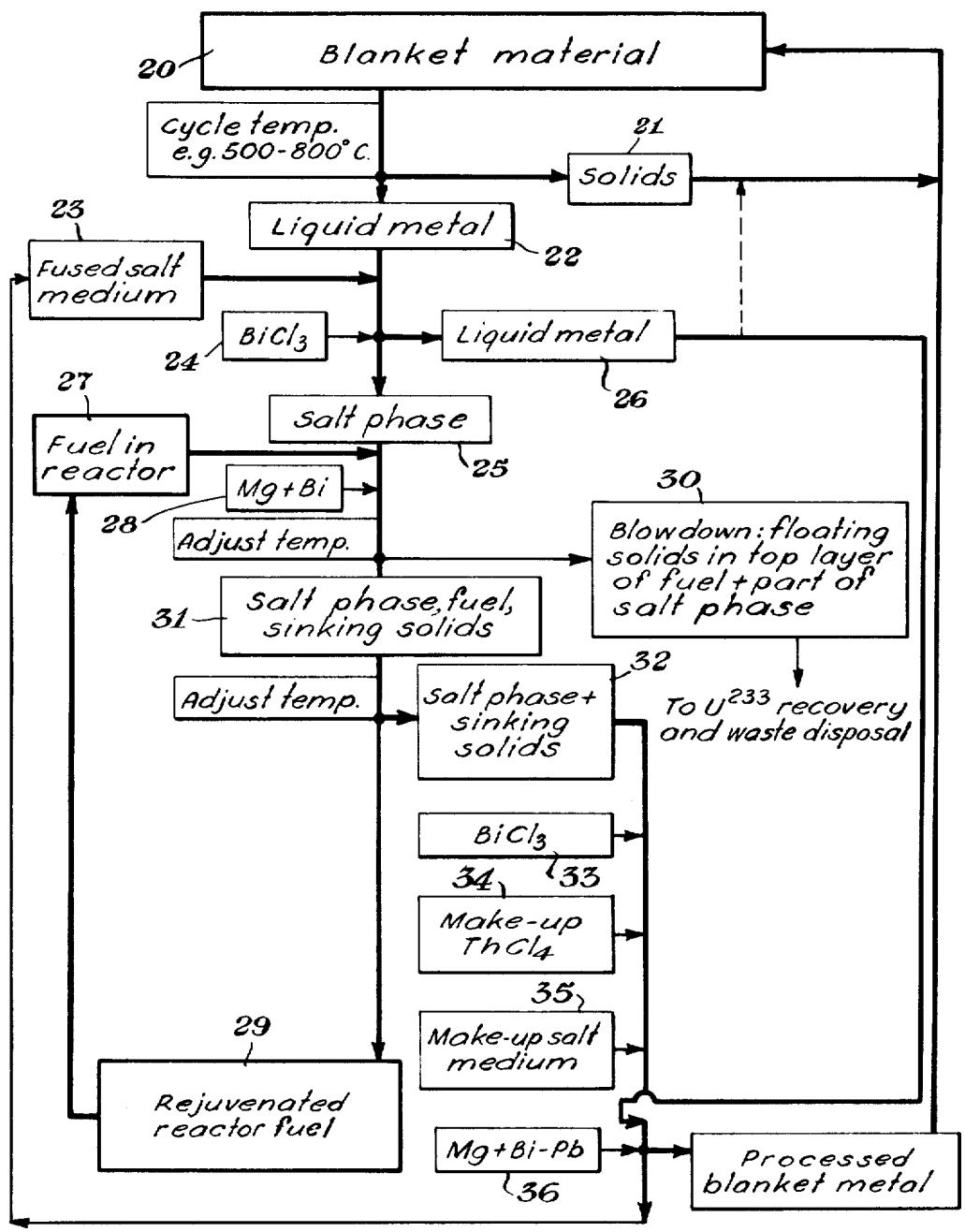
FIG. 1 is a flow sheet showing the sequence of steps according to an embodiment of the process of the invention.

FIG. 17 is a sectional view taken along line 17—17 of FIG. 15, showing an arrangement of individual fuel processing cups which are attached to and communicate with the floor of the fuel processing vessel; and FIG. 18 is a vertical sectional view of a recovery vessel for the recovery of uranium 233 from the "blowdown," or discarded liquid metal and salt, periodically discharged from the fuel processing vessel.

To prevent the loss of neutrons normally escaping from the "core" of a nuclear reactor and to make efficient use thereof, a "blanket" formed of a liquid metal, such as bismuth, or bismuth-lead alloy, containing a dispersion of a "fertile" material, such as thorium, is disposed around the reactor core, or even within the core region. Thorium is employed in the form of a thorium-bismuth or thorium-lead intermetallic compound dispersed in the liquid metal. Atoms of thorium 232, on being exposed to a suitable neutron flux, capture neutrons and are converted to thorium 233 which gradually changes to protoactinium 233 and then uranium 233, as well understood in the nuclear physics art. Uranium 233, obtained by "breeding" thorium 232, is a "fissionable" material and thus is usable as nuclear reactor fuel. In a reactor in which neutrons are efficiently captured and employed in breeding fertile material it is possible to form as much or even more fuel as is required for operation of a reactor. Once an efficient reactor is started up on fissible material formed by breeding, it is readily possible to make the reactor self-sufficient as to nuclear fuel requirements.

In operating such a reactor the fuel is processed from time to time continuously or periodically to free the fuel of fission products, especially those which readily capture neutrons and are known as "poisons," and which interefere with maintenance of a "chain reaction" in the reactor core.

The blanket material must also be processed to recover fissionable material formed therein and to remove fission products arising therefrom.

The present nuclear reactor and integrated blanket-fuel processing cycles provide for the processing of both blanket and fuel and of efficiently transferring newly formed fissionable material directly from the blanket to the fuel, thus accomplishing the objects of the invention. If desired, apparatus may be included for recovering the breeding gain.

The liquid metal fuel preferably consists of molten bismuth containing from about 0.2 to about 1 percent by weight of uranium. The concentration degree of enrichment of uranium employed is dependent on reactor design as well understood in the art. In addition, since uranium is sparingly soluble in bismuth, elevated core temperatures above about 400° C. are necessary to keep more than about 0.6 to 0.7 percent of uranium "in solution." A desirable uranium concentration for the present reactor is about 0.4 to 0.6 percent by weight.

The liquid metal employed in the blanket may be bismuth, or bismuth-lead alloy. It is generally desirable to use a substantial amount of lead to decrease the cost of the liquid metal somewhat and to decrease the melting point of the blanket system. Thorium forms an intermetallic compound with bismuth except at very high lead concentrations, e.g., above about 90 percent lead, 10 percent bismuth, in which case thorium-lead compound is formed. Desirably 60 to 80 percent by weight of lead is employed in the liquid phase in equilibrium with settled $ThBi_2$ dispersion.

Thorium is generally employed in the blanket at a concentration of 12 to 18 percent by weight as a slurry. Breeding efficiency, i.e., neutron capture, falls off at lower thorium concentrations, while at higher thorium concentrations, the slurry of intermetallic compound is difficult to circulate through blanket passageways.

A further difficulty is encountered in circulating the slurry in the event thorium intermetallic compound assumes the form of large platelets. Large platelet formation is remedied by the use of ultrasonic energy, or temperature cycling, or even grinding, as understood in the art, or avoided by "shooting" the alloy from a shot tower, for example. Once about equiaxed particles of compound are obtained, they can generally be prevented from forming large platelets by exercising good temperature control and by temperature cycling with good agitation.

The integrated blanket-fuel cycles of the invention are described as follows, reference being had to FIG. 1:

Blanket material 20, such as a dispersion of $ThBi_2$ or $ThPb_2$ in bismuth-lead alloy, is circulated through hot and cold zones (but not below about 450° C.) adjacent a reactor core, or otherwise subjected to temperature variations to cause transformation of the dispersion to other crystalline modifications or compounds whereby fissionable material, such as uranium 233, formed in the dispersion is released from the solid and taken up by the liquid metal. In using a dispersion of $ThBi_2$ in bismuth-lead alloy, temperatures in the range of 500 to 800° C. are employed to transform $ThBi_2$ particles to $ThBi$ particles and back again to $ThBi_2$ particles. At other temperature ranges other thorium-bismuth or thorium-lead compounds may be employed as more fully described in my copending application, Serial No. 128,827, filed August 2, 1961, now U.S. Patent No. 3,130,042.

The blanket material 20, after temperature cycling, is processed while at a temperature of at least 550° C. to separate the dispersed solid particles 21 from substantially solid-free liquid metal 22. This may be done by means of a centrifuge, or the dispersion may simply be held in a quiet settling zone where the solid particles drop out.

To save space in the drawing, a large black dot, or circle, at line intersections indicates that separation of liquid from solid is carried out.

The settled solids 21 are redispersed in liquid metal remaining in the blanket region and at least partly returned to the blanket region, or held for subsequent dispersion.

The liquid metal 22, which was separated from solids 21, is contacted with a fused salt mixture consisting of fused salt medium 23, and bismuth 24. The fused salt medium is made up of an appropriate melting mixture of metal chlorides, e.g. KCl and NaCl in the proportions of about 1:1. In general, any salt mixture may be used which is adapted to be employed as a reaction medium and as a transport medium. The salts used should form a mixture which melts from about 50 to about 200 degrees higher than bismuth, to permit the use of salt traps in some of the flow lines. The salt mixture also should not interfere with oxidation-reduction reactions between uranium and thorium. The salts should be more stable than lead chloride, i.e., they should not oxidize lead. Generally, the chlorides, more particularly some alkali metal chlorides, are least expensive, and a mixture of sodium chloride and potassium chloride exhibits desired characteristics. In the processing according to the invention, $MgCl_2$ becomes a part of the salt mixture as a result of repeated reduction reactions employing magnesium. The bismuth chloride 24 is added to the salt mixture to oxidize uranium 233 and those fission products forming a more stable chloride than bismuth. The amount of bismuth chloride added is carefully adjusted to avoid oxidizing lead to lead chloride after the uranium in the liquid metal is oxidized, since lead reduces the solubility of uranium in bismuth and should be kept out of the fuel in subsequent integration of the blanket and fuel cycles. Oxidation of lead is avoided by stopping the addition of bismuth chloride before all the uranium 233 is oxidized, i.e. while at least a trace of uranium 233 remains, e.g., at least 10 p.p.m., but more generally, while ¼ to ½ of the uranium remains in the blanket portion being processed. The addition of excess bismuth chloride is avoided by following uranium 233 activity in the liquid metal and an addition is stopped at a predetermined level of uranium activity. Once the reactor is in steady state operation, changes in the amounts of uranium oxidized at this step are reflected in the total reactivity of the core.

At the end of the titration step, about one-half or more of the uranium 233, and nearly all of the alloyed thorium, in addition to small amounts of oxidizable fission products, have been transferred in chloride form to the salt phase 25, while some small amounts of non-oxidizable, or noble, fission products and alloyed thorium remain in the liquid metal 26.

The liquid metal 26 may be mixed with settled solids 21 and returned to the blanket region of the reactor if desired, but generally, it is held for the return of the oxidized thorium and the addition of make-up thorium, which is all reduced by magnesium-bismuth-lead alloy in the blanket processing vessel after fuel processing.

Used or spent liquid metal fuel 27, containing the requistie proportions of uranium 233, completely alloyed with bismuth and entirely liquid at temperatures above about 350° C., is transferred from the core region of the reactor to a processing zone or vessel. Here the fuel 27 in molten form is brought into contact with the salt phase 25 in molten form which has been transferred from the blanket processing vessel. Oxidizable fission products in the fuel 27, capable of forming chlorides more stable than $UCl_3$, are oxidized by the $UCl_3$ in the fused salt phase 25, the reduced uranium ($U^{233}$) alloying with the liquid metal fuel 27. Generally, the number of moles of $UCl_3$ in the salt 25 exceeds the number of moles of oxidizable fission products in the fuel 27. The total reactivity of the reactor is checked and the requisite amount of Mg-Bi alloy 28 is added to reduce the UCl₃ remaining in the salt phase 25. Meanwhile the oxidizable fission products transfer to the salt phase 25.

Most of the thorium chloride in the salt phase 25 is reduced simultaneously with the uranium chloride and forms insoluble thorium-bismuth intermetallic compound, e.g., $ThBi_2$, which settles through the molten bismuth to the bottom of the vessel. Upon reducing the temperature of the bismuth alloy, i.e., the fuel being processed, to about 300 to 450° C., depending on the concentration of uranium that must be maintained, non-oxidizable fission products, which also are sparingly soluble in bismuth, separate out as solids, and being lighter than the bismuth alloy, float therein adjacent the metal-salt interface.

The liquid metal which is to be returned to the individual fuel elements is then in the condition of an intermediate layer of liquid metal lying above settled thorium-bismuthide dispersion, and below the salt layer and the floating solid particulate noble fission products. This intermediate layer, on being separated from upper and lower layers constitutes processed, enriched, rejuvenated, reactor fuel 29. The separation is achieved by first "blowing down" a quantity of "blowdown" 30, consisting of the floating fission products in the upper interface region of the liquid bismuth, or fuel, along with a lower portion of the salt phase, generally one-tenth to one-fifth of the salt phase. The blowdown 30 is discarded or stored for subsequent processing. The remaining mixture 31 consisting of salt phase, rejuvenated fuel and sinking solids ( thorium intermetallic compound) is generally permitted to warm to about 500 to 550° C., to assure uranium solubility, and the intermediate fuel layer 29, i.e., the rejuvenated fuel, is withdrawn from between the salt phase and the underlying sinking solids and returned to individual fuel elements in the reactor core region.

The combination 32 of remaining salt phase in contact with sinking solids (actually thorium compound settled in a small amount of fuel) is retained in the processing vessel and bismuth chloride 33 is added to the fused salt phase in substantially stoichiometric amount to thorium present to oxidize the thorium and the small amount of uranium in the metal phase to the respetcive chlorides. These chlorides are then taken up by the salt phase thereby effecting transfer of thorium and uranium values from the residual metal or fuel phase to the salt phase. Make-up thorium chloride 34 to replace thorium converted to uranium 233 in the blanket, and make-up salt medium 35 are added to the salt phase which is then transferred ordinarily through a salt crossover to the blanket processing zone or vessel, although the make-up thorium chloride and salt medium can be added directly to the blanket processing vessel, if desired.

Then molten magnesium-bismuth-lead alloy 36 is added to the molten salt mixture which is in contact with earlier treated liquid blanket metal 26 in the blanket processing vessel. The reduction of thorium chloride and uranium chloride takes place immediately, as the blanket processing vessel is maintained constantly at a temperature in the range of 550 to 600° C. The thorium and uranium formed by reduction alloy with the liquid metal 26, restoring the desired level of thorium concentration. The so processed and rejuvenated liquid metal, i.e., processed blanket metal 37, is then separated from the salt-metal mixture and returned to the blanket region where it mingles with and resuspends solids 21. This renewed dispersion is blanket material 20 which is circulated adjacent the core region for further breeding. The fused salt medium 23 remaining in the blanket processing vessel is retained for the next processing cycle.

After a predetermined period of 12 to 20 hours or more, during which time rejuvenated blanket material and rejuvenated fuel are mixed with material in the blanket and core regions respectively, new portions of blanket material and fuel are transferred to respective processing vessels to start the processing cycle again. Generally from 5 to 20 percent by weight, and preferably 10 percent, more fuel is placed in the core region than is required for criticality, and it is this excess which is processed per cycle according to the preferred embodiment of the process of the invention. It is desirable from the standpoint of economics to avoid tying up as total inventory, in use and in processing, more than 115 percent by weight of fissionable material than is required for criticality of the core. A distinct advantage of the present reactor is that it provides for a uniformly constant inventory of liquid metal fuel in the reactor system.

Figure 2:
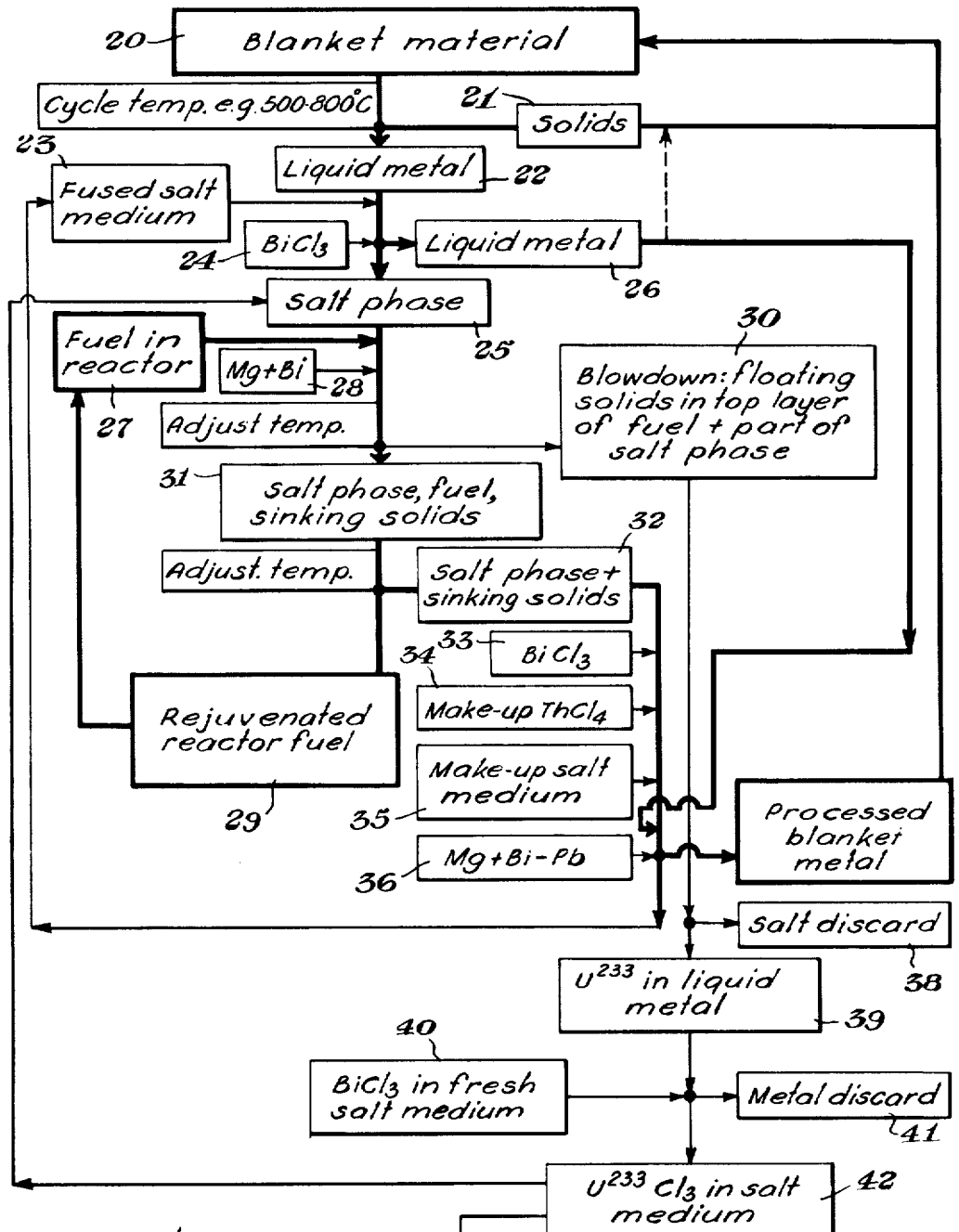
FIG. 2 is a flow sheet illustrating a different sequence of steps according to the process of the invention.

In another embodiment of the process of the invention, as will be better understood with particular reference to FIG. 2, a greater proportion of fuel can be blown-down from the fuel processing vessel to achieve better removal of noble fission products. The blowdown 30 is transferred to a uranium 233 recovery vessel, maintained at a temperature in the range of 550 to 600° C., where the salt phase 38 is separated and discarded to waste disposal or storage. The bismuth metal phase 39, containing uranium 233, as well as noble fission products, is then contacted with bismuth chloride in fresh salt medium 40. The requisite amount of bismuth chloride is used to oxidize the uranium 233 in the bismuth metal phase to the salt phase. The metal phase 41 is separated and transferred to waste disposal or storage and the $P^{233}Cl_3$ in salt medium 42, now substantially free of fission products, is recycled, as desired, to the salt phase 25 in the fuel processing vessel or to storage for subsequent use or sale. The amount of $U^{233}Cl_3$ recycled to the fuel processing vessel compensates for the amount of blowndown in excess of the breeding gain. If the breeding gain is quite high (above 5 percent) it will be clear that such recycling will not be needed unless the maintenance of low levels of noble fission products in the fuel is not otherwise obtained by the 5 percent blowdown of rejuvenated fuel from the fuel processing vessel. The nuclear reactor of the invention and associated steam plant, e.g., for the production of electric power, are shown diagrammatically in FIG. 3. The reactor, indicated generally by the numeral 43, consists of a core 44, a blanket 45, associated coolant means 46, and a circumferential reflector 47 inside a gas tight steel shell 48 or other suitable containment means. The coolant means 46 extracts heat from both the core and blanket regions and heats a heat transfer liquid, such as sodium, lead, or water, in a heat exchanger 49. Generally, the heat exchanger 49 is placed inside the steel shell 48. The heat transfer liquid transports heat generated in the reactor to a steam plant 50 outside the containment means 48.

The reactor and associated processing equipment are disposed inside a vessel 48 or other enclosure which in turn is surrounded by biological shielding 51, e.g., a thick layer of concrete on all sides. Blanket processing means 52, fuel processing means 53, and means 54 for recovering excess bred $U^{233}$ from "blowdown" material when employed constitute the processing equipment located within the shielded area. Flow means 55 are provided for moving blanket material from the blanket to the blanket processing equipment and back again. Flow means 56 are provided for moving fuel to the fuel processing equipment and back again. Flow means 57, termed the "salt-crossover," are provided for transporting fused salt between the two sets of processing equipment. Additional flow means 58 are provided for transporting blowdown materal from the fuel processing vessel 53 to the $U^{233}$ recovery vessel 54. Still additional flow means are provided for bringing reactants and materials from outside the shielded area to the processing equipment and for transferring recovered $U^{233}$ to storage and metal and salt discard to radioactive waste disposal.

Figure 4:
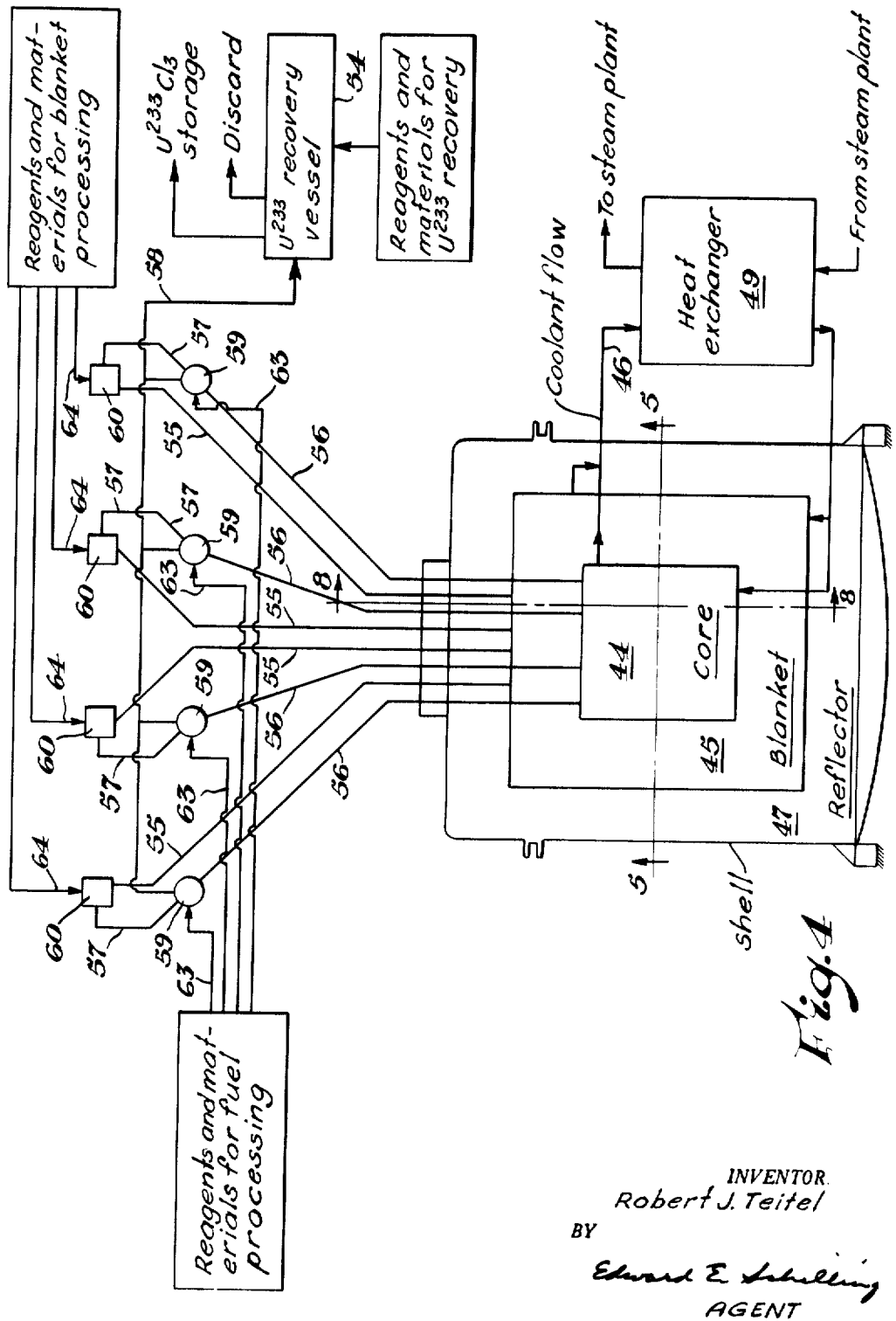
FIG. 4 is a diagrammatic largely schematic view of the reactor in vertical section taken along line 4—4 of FIG. 5 and showing greater detail of the processing equipment.

A suitable schematic arrangement of parts for the processing equipment inside the shell of the reactor of the invention is shown diagrammatically in vertical section in FIG. 4. The core 44 and blanket 45 of the reactor are, in practice, divided into a number of sections, or sectors. Each sector is controlled and processed individually. As shown, means 56 are provided for transferring fuel from the core to individual fuel processing vessels 59. There are also provided an equal number of blanket processing vessels 60 which are in communication with respective blanket sections by flow means 55. Flow means 57 are provided to transfer fused salt between the respective fuel processing vessel and blanket processing vessel for a given sector. Flow means 58 are provided to transfer metal and salt "blowdown" to a $U^{233}$ recovery vessel. To avoid undue complexity in the drawing, individual flow means for bringing reagents and materials to each vessel are not individually shown. Additional uranium 233 recovery vessels 54 may be employed if desired, but one is generally adequate.

Figure 5:
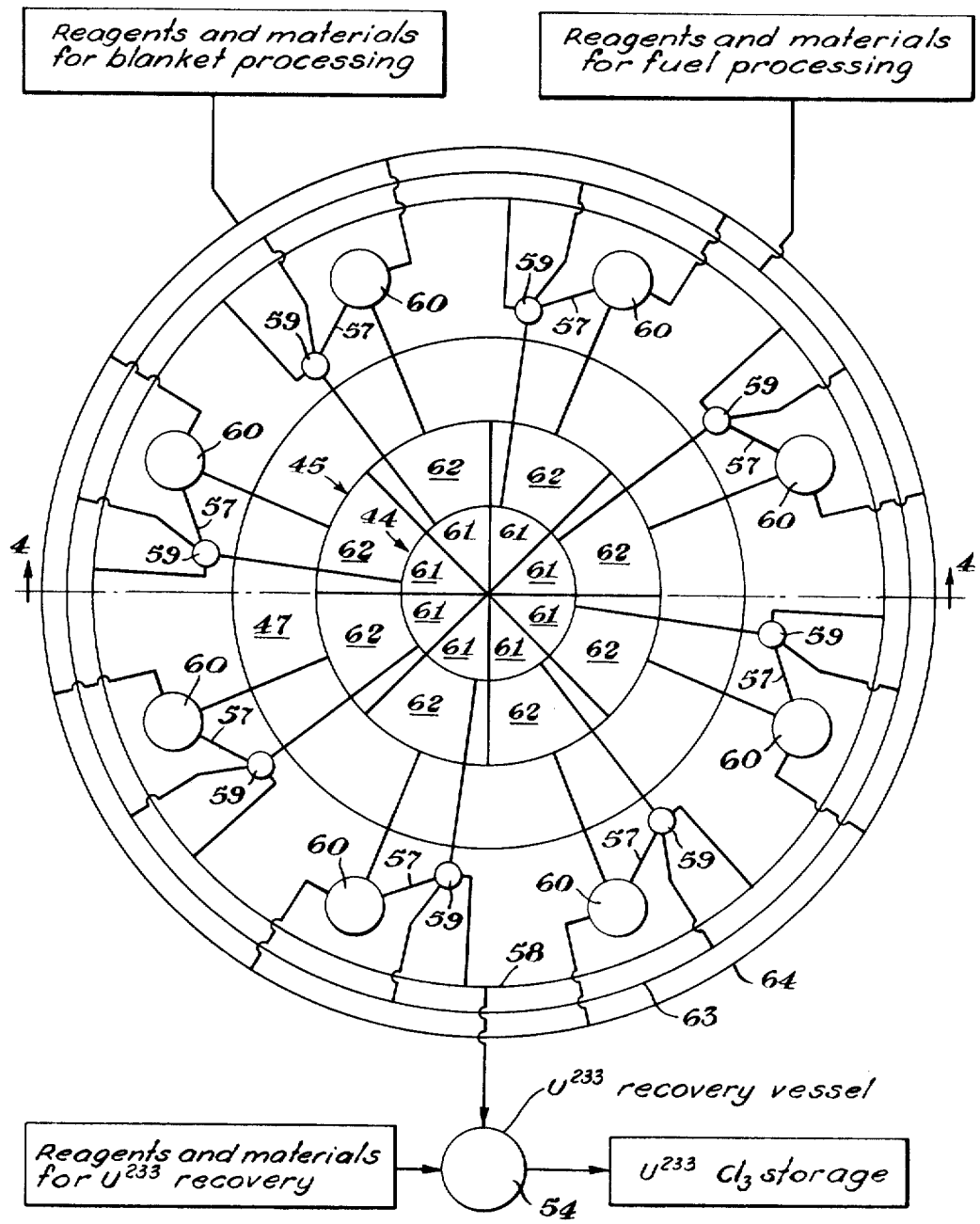
FIG. 5 is a diagrammatic horizontal sectional view taken along line 5—5 of FIG. 4 showing the relation of the core region to the blanket region and the reflector and showing schematically the associated fuel and blanket processing vessels and associated piping. Coolant lines have been omitted and are shown subsequently in the interest of clarity.

The fluid flow means and the relationship of the individual processing vessels to the separate reactor sectors will be more clearly understood with reference to FIG. 5 in which the reactor is shown diagrammatically in horizontal section, taken through the core region. For the sake of simplicity, the associated processing vessels and piping are shown arranged schematically around the reactor, whereas in actuality, they are generally disposed above the core and blanket. The reactor as shown consists of a core 44, having eight pie-shaped sectors 61, a circumferential blanket 45, likewise consisting of eight sectors 62, aligned with respective core sectors 61, and a reflector layer 47, such as one of graphite, surrounding the blanket.

The disposition of liquid metal fuel and liquid metal blanket in the reactor and the flow of coolant through the reactor will be more fully explained hereinafter and illustrated in subsequent figures in the drawings.

Each sector is provided with a fuel processing vessel 59 and a blanket processing vessel 60 which communicate with the fuel elements in the core and with the blanket region, respectively, and are interconnected by salt crossover piping arrangements 57. The fuel processing vessels 59 are connected to a uranium 233 recovery vessel 54 by flow means 58 in the form of a common line or header. If desired, more recovery vessels may be used. Also, if desired, individual lines may be run directly from each fuel processing vessel to the uranium 233 recovery vessel or vessels. Reagents and materials may be supplied to the fuel processing vessels through a common header 63 or individual lines may be used. The blanket processing vessels, as shown, are similarly supplied with reagents and materials through lines 64.

Figure 6:
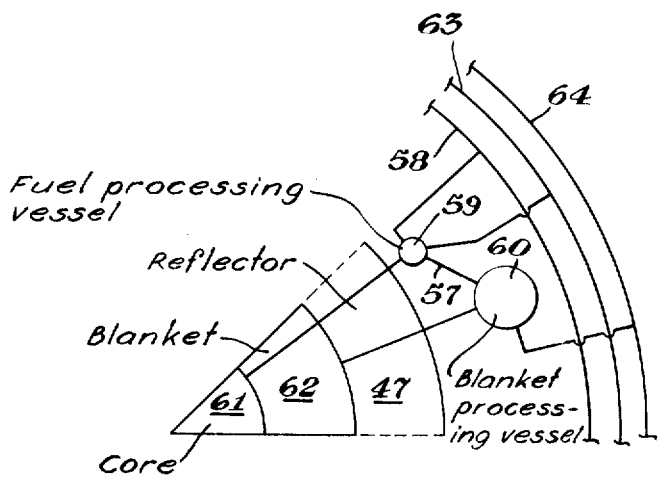
FIG. 6 is a fragmentary part of FIG. 5 showing just one of the sectors of the reactor and the associated fuel and blanket processing vessel.

The relationship of the major parts of a given sector and the corresponding processing vessels and segments of headers or lines (flow means) are illustrated for a single sector in FIG. 6.

Figure 7:
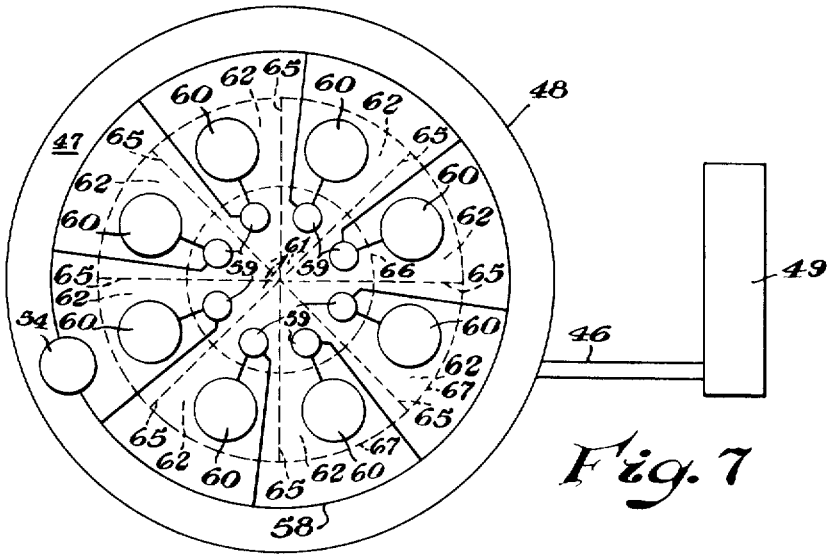
FIG. 7 is a top plan view of the reactor illustrating the relation of processing vessels to the sectors in a suitable assembly of apparatus for carrying out the process of the invention.

Referring more specifically to FIG. 7, there is shown a diagrammatic top plan view of a reactor having 8 sectors and associated processing vessels. The dotted lines 65 indicate the sector boundaries. The dotted line 66 indicates the perimeter of the core region, and the dotted line 67 indicates the perimeter of the blanket region. Fuel processing vessels 59 are located above each fuel or core sector 61 and are individually in communication with a blanket processing vessel 50 above each blanket sector 62. Flow means 58 connect each fuel processing vessel to the $U^{233}$ recovery vessel 54. For the sake of simplicity, other piping, such as the coolant system and the reagent supply system, is omitted from this view.

Relative sizes are approximately in suitable proportion for a 200,000 megawatt reactor having a core in the form of a right cylinder 6 feet in radius and 6 feet in height, a blanket section 3 feet thick in the radial direction, a 2 foot layer of graphite reflector and a surrounding reactor shell 48, which is 22 feet in diameter.

A more specific and detailed illustration of a suitable arrangement of parts inside the reactor shell is shown in FIG. 8, in which one-pie shaped sector is shown diagrammatically in a fragmentary vertical section taken along the line 8—8 of FIG. 4 in a plane radial to the reactor. The parts shown include the associated fuel processing vessel and blanket processing vessel, some of the associated piping being shown in a schematic arrangement.

As shown in FIG. 8, the reactor itself consists generally of top, side and bottom reflector regions, 68, 69, 70; top and bottom blankets, 71, 72; and a side blanket indicated generally by the numeral 73; a core region 44; and a metal envelope, 75, preferably gas tight. The metal envelope 75, or shell, may be omitted if desired. More importantly, a metal envelope, or other suitable containment means, should entirely enclose in a compact arrangement the reactor, processing vessels and, preferably, the heat exchanger in order to keep the processing vessels hot and to avoid unnecessary thermal losses.

The shell 75 shown is provided with a conveyor 76 which is removable to permit access to the core region 44, necessarily by remote control once the reactor has been started up.

The core region 44 consists of a graphite body 77 having openings or cavities therein to receive liquid metal fuel elements 78, e.g., desirably of the plunger type described in copending application Ser. No. 51,605, filed August 24, 1960. Each fuel element 78 is provided with adjacent or contiguous coolant passages 74 which are interconnected by larger horizontal connecting passages 79 at the top and bottom of the core section. The larger coolant passages 79 are directed to the outside of the reactor and at the shell 75 are connected to piping which communicates with the heat exchanger via a header (not shown) as well understood in the art.

The fuel elements 78 are actuated and controlled by pneumatic means 80. An inert gas such as helium is introduced into the element via lines 80 connected to the top, or lines 80a connected at the side of the element. Liquid metal fuel is transferred from the fuel elements 78 to the fuel processing vessel 59 via tubing lines 81, provided with freeze valves 82.

The top and bottom blankets 71, 72, above and below the core region 44, may be constructed of thorium-metal which is generally not processed during the useful life of the reactor. Or, if desired, thorium oxide or a dispersion of thorium in a liquid metal may be used in the top and bottom blanket sections in suitable containers. The side blanket 73, shown mainly in dotted outline in FIG. 8, is arranged to accommodate most of the breeding of thorium 232 to uranium 233 and consists of vertical passages 83, which are interconnected at the lower ends thereof by a bottom horizontal passage 84. The tops of the vertical blanket passages intersect and communicate with a top horizontal tank section 85.

Figure 9:
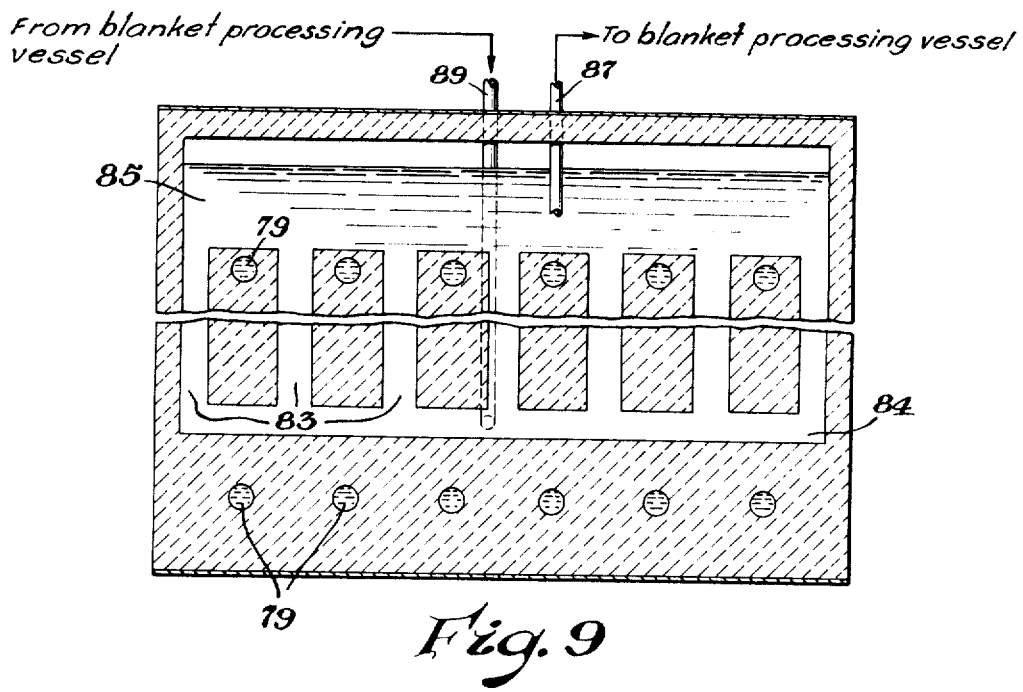
FIG. 9 is a vertical sectional view of the blanket section of the reactor, the view being taken along line 9—9 of FIG. 8.

Referring to FIG. 9 whcih shows part of the blanket region of one sector in vertical section, it may be seen that both the bottom horizontal passage 84 and the top horizontal tank 85 are substantially coextensive with the width of the sector in this region. Seven radially disposed vertical passages 83 spaced apart along the sector width provide communication between the top horizontal tank section 85 and the bottom horizontal passageway 84, so that blanket liquid metal dispersion containing fertile material may circulate thermally in a region of neutron flux or it may be pumped by a gas lift or other suitable means.

If desired, a greater or smaller number of vertical passages than seven may be employed in each of three or four or more rows disposed, respectively, at various distances from the core region depending upon the neutron economy desired in the breeding process. Desirably, the thickness of graphite separating the core region and the nearest row of vertical passages, and between succeeding rows of passages, increases from small thicknesses such as about 1.5 inches to greater thicknesses such as 4 or more inches. Also, the first row of vertical passages adjacent the core region is smaller in cross-section than passages in succeeding rows which are made progressively larger to afford more efficient neutron capture. Generally, most of the breeding takes place in the first several rows of passages.

The blanket region is also traversed by coolant passages which pick up in this region about 10–30 percent of the thermal energy released in the reactor dependent upon the uranium concentration under equilibrium operation. Some heat is also generated in the blanket processing and fuel processing vessels which are provided with cooling coils 86. These coils also may communicate with the heat exchanger and add to the thermal output of the blanket region and the core region. Helium may be used to cool the vessels and to be cooled by helium purification system.

Blanket material to be processed to extract uranium 233 therefrom is transferred from the top horizontal tank section 85, which must be gas-tight, through tubular means 87 to the blanket processing vessel 60, by displacement upon applying helium pressure via the tube 88 or inlet extending through the cover 76. The return line 89, from the bottom of the blanket processing vessel 60, is controlled by a freeze valve 90.

Figures 10, 11:
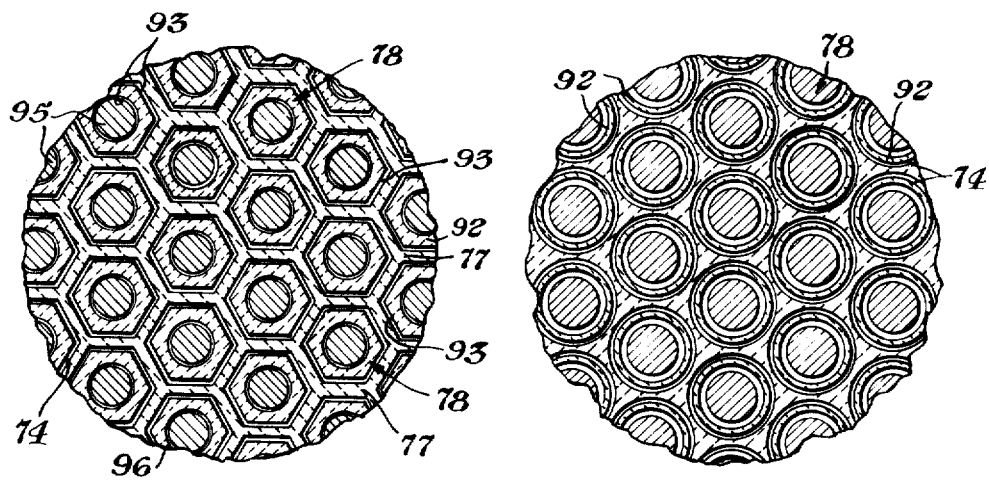
FIG. 10 is an enlarged fragmentary horizontal view taken in the core region of the reactor showing one scheme for nesting liquid metal fuel elements having a hexagonal transverse section in the core block.
FIG. 11 is a similar fragmentary sectional view showing a scheme for nesting liquid metal fuel elemnets having a circular transverse section in the core block.

An example of fuel element arrangement is shown in FIG. 10, in which a fragmentary portion of the core region is viewed in horizontal section. The fuel elements 78 are disposed in individual cavities in the core body 77 or block. The core block is desirably a single piece of graphite having fuel element cavities and coolant passages 74 formed therein as by drilling or cutting. Each fuel element cavity is slightly larger than the fuel element therein, and the void space 74 remaining around the fuel element when it is in place serves as a vertical coolant passage. Spacing of fuel element cavities must follow calculations based on reactor physics for best operation of the reactor. Generally the fuel elements in the center of the core region are provided with somewhat larger vertical coolant passages, since the thermal heat flux generated there is higher.

In FIG. 11 there is shown a similar fragmentary sectional view of another arrangement of fuel elements in a core block, the fuel elements being circular in cross section.

The details of suitable core structure will be more fully understood with reference to FIG. 12, in which there is shown a fragmentary portion of the core region and superstructure in vertical section, the plane of the vertical section being transverse to the upper and lower horizontal coolant passages 79, which generally extend more or less radially from about the center of the core.

The fuel elements 78 are shown positioned in cavities in the core block 77. The lower end of each element 92 extends into a shallow close fitting part of the cavity. The rest of the cavity is large enough to define horizontal 79 and vertical 74 coolant passages around the fuel elements. Each fuel element 78 consists of a graphite body 92 having sidewalls 93 and a bottom 94 defining a plunger cavity. An elongated plunger 95 is disposed in the plunger cavity in each fuel element providing an annular space 96 between the plunger 95 and the sidewalls 93.

Inside each fuel element the relationship of the plunger size to the plunger cavity determines the annular space provided for fuel displaced from the bottom of the cavity on depressing the plunger.

The fuel element to the right of FIG. 12 is shown with the plunger 95 in the raised position with the liquid metal fuel 97 at the bottom of the plunger cavity. When the reactor is fully fueled but the fuel in all or most of the fuel elements lies thus at the bottom of the plunger cavity, the reactor is sub-critical.

In the fuel element to the left in FIG. 12, the plunger is in the lowered or depressed position in which the fuel 97 is displaced up into the annular space between the plunger and sidewalls and above the plunger. With substantially all of the fuel elements in this condition, the reactor is designed, according to well-known nuclear physics, to have sufficient fuel and moderator in the requisite configuration to be critical.

The plunger 95 of each element is actuated and controlled by a piston 98 attached to the upper end of the plunger by a connecting bar or rod 99. The piston 98 slideably engages the inner surface 100 of the hollow cylindrical cover 101 of the fuel element. Pneumatic lines 80, 80a connected to a helium gas supply and a vacuum pump through appropriate valving (not shown), and to the top and side respectively of the cover 101 and communicating with the interior of the cover, permit the creation of the requisite pressure differential across the piston 98 to cause it to move in the desired direction.

Sufficient liquid metal fuel 97 is employed according to the invention so that part of the fuel lies above the plunger and can be withdrawn for processing; for example, from 5 to 20 percent, but more usually about 10 percent and preferably less than 15 percent by volume, of the fuel in the fuel element. The fuel above the plunger passes through a port 102 in the wall 93 of the fuel element and enters a connecting small vertical cavity 103. Fuel is displaced from the small vertical cavity 103 through a tube 81 to the fuel processing vessel above the sector upon increasing the helium gas pressure over the liquid metal in the element sufficiently to overcome the liquid head. At the same time, the helium pressure must be increased above the piston 98 to maintain sufficient pressure differential to keep the plunger depressed. If desired, a second port may be provided between the plunger cavity above the plunger and the small vertical cavity 103 at a level above the liquid metal level.

While the reactor is generally controlled by placing the requisite number of fuel elements in the operating or critical configuration (plunger depressed into fuel) or in controlling the plunger positions, if desired, a liquid metal control element may be included in one or more of the sectors in the reactor. A suitable location for such a control element is about ¼ the distance from the center of the core region to the perimeter of the core. An example of a suitable control element which is pneumatically controllable in a manner similar to the fuel elements, and which employs a liquid metal poison such as a cadmium-bismuth alloy, is shown in FIG. 13. On supplying helium pressure through inlet tube 104, the piston 105 is depressed, thus shoving the plunger 106 into the liquid metal poison 107. In this manner, the liquid metal poison is displaced into the suitably moderated "hot" zone of the core. On increasing the relative helium pressure through inlet tube 108, the piston 105 is forced upwardly, raising the plunger 106 and permitting the liquid metal 107 to return to the space below the plunger.

The seals on the pistons, between the cylinder 101 and the body 93 are designed to permit a controlled leakage, thereby providing a sweep of helium sweep gas for removing gases from the surface of the fuel 97.

An example of a suitable blanket processing vessel is shown in FIG. 14. The vessel, indicated generally by the numeral 60, is generally cylindrical in shape except for a conical bottom 109. An inlet fitting 110 in the sidewall of the vessel provides entry for blanket material (i.e., settled solids-free liquid metal) displaced from the blanket as by helium pressure. A tubular member 111 or section extending downwardly from the top 112 of the vessel and communicating with the salt crossover line 57 to the fuel processing vessel, is of a suitable length to permit transferring substantially all of the fused salt phase 113 to the fuel processing vessel. Transfer is accomplished on applying helium pressure via an inlet tube 114 which extends through the top of the vessel. Still an additional inlet fitting 115 in the top 112 of the vessel and extending therethrough, is connected to a source of $BiCl_3$, as well as to make-up $ThCl_4$ salt medium, and UCl₃, if desired. A fluid inlet 116 extending through the sidewall 117 of the vessel above the inlet 110 for settled blanket material is used for the introduction of Mg-Bi-Pb alloy. Processed and rejuvenated liquid metal blanket material 118 (i.e., containing make-up thorium) is returned to the blanket through an outlet 119 at the apex 120 of the conical bottom 109. Coolant coils 121 surrounding the blanket processing vessel are used to control the temperature of material being processed since a substantial amount of heat is released by "decaying" radioactive material in the vessel. The absorbed heat is preferably transferred to the heat exchanger and adds to the thermal output of the reactor.

The blanket processing vessel 60 may be made from an impermeable grade of graphite or other suitably inert material. If the vessel is made of graphite, the top or cover may be cemented on as indicated by the cemented joint 122, or otherwise suitably attached.

As explained hereinabove and shown in FIGS. 5 and 7, a fuel processing vessel 59 is provided for each sector of the reactor. More or fewer processing vessels may be used, if desired, but it is essential that there is provided for each fuel element for which fuel is being processed a cup, or individual tubular fuel holding member.

Referring now more particularly to FIG. 15, there is shown a sectional elevation of a fuel processing vessel 59 consisting of a hollow generally cylindrical upper portion 123 having sidewalls 124, a cover 125 and a floor 126 and a lower portion 127 consisting of individual cups 128 communicating with the upper portion 123 and extending downwardly from the floor 126 thereof. The fuel processing vessel may be constructed of graphite or other suitably inert material resistant to the attack of molten bismuth alloy and to fused salts, e.g., chlorides. In the event the vessel is made of graphite, the cup 128 can be formed by drilling out cavities in the graphite. Care should be taken to avoid cup arrangements which would so moderate hte fue las to cause critical conditions in the fuel processing tank.

The individual cups 128 are each provided with respective passages or liquid flow lines 129 attached or formed above and adjacent to the lower end of each cup and communicating with a fuel element (not shown) via a salt trap (also not shown). If desired, inert gas lines may be connected by pipe T's to the liquid flow lines to provide a flow of gas to the individual cups 128 to provide mixing action. Generally, the cups 128 and connecting liquid flow lines 129 are constructed so that the same volume of liquid metal is held in each cup below the liquid flow line connection to the cup. The cup is also designed and made to hold, above the flow line connection level, the volume of liquid metal fuel brought in for processing in each cycle. Essentially, the liquid metal fuel fills each cup level to the floor 126 of the blanket processing vessel.

A suitable arrangement of flow lines or passages in a fuel processing vessel constructed of graphite is illustrated in FIG. 17.

If trouble is encountered with thorium compound settling onto the floor 126 instead of down into the cups 128, the upper ends of the cups may be grossly countered or widened to leave little floor space not inclined toward the cups. Also, if desired, the molten magnesium-bismuth alloy may be added to the individual fuel cups 128 instead of to the salt layer in the fuel processing vessel. This may be accomplished by running individual lines from a magnesium-bisumth alloy reservoir to a T connection in each fuel line 81 (leading to a cup) adjacent the processing vessel. Distribution of identical amounts of alloy to each cup is accomplished by carefully designing and constructing the lines to have precisely equal flow resistance to the magnesium-bismuth alloy.

The upper part 123 of the fuel processing vessel is provided with an inlet 130 through the cover 125 for helium or other inert gas, an inlet 131 for BiCl₃, make-up ThCl₄ and make-up salt medium, a special inlet fitting 132 for salt medium transferred from the blanket processing vessel and an inlet fitting 133 for molten magnesium-bismuth alloy. The delivery end 134 of the inlet for magnesium-bismuth alloy is preferably provided with multiple openings 135, as shown in relative enlargement in FIG. 16, to disperse the alloy more widely.

An outlet fitting 136 extending through the sidewall 124 of the vessel at the level of the floor 126 permits blowing down liquid metal 137 lying just at and above the level of the upper edges of the cups, as well as fused salt 138. Cooling coils 139 surrounding the fuel processing vessel are used to extract useful heat from the vessel and to control its temperature.

The mixture of liquid metal and fused salt "blown down" from the fuel processing vessel carry oxidized fission products, noble fission products and uranium 233. An example of a vessel 54 in which recovery of uranium 233 may be carried out is shown in vertical section in FIG. 18. The vessel is best formed of an impermeable grade of graphite or other inert structureal material resistant to the attack of fused salt and bismuth alloy. The vessel 54 illustrated is generally cylindrical in shape and provided with a conical bottom section 140. The sidewalls 141 of the vessel are provided with an inlet 142 adjacent the cover 143 of the vessel for the "blowdown," i.e., mixture of liquid metal and fused salt blown down from the fuel recovery vessel, an outlet 144 disposed so as to be at the usual salt-metal interface to handle salt being transferred to radioactive waste storage or disposal, and an outlet 145 at the bottom end 146 or apex, of the conical section 140 for the removing uranium-free liquid metal containing fission products and transferring it to radioactive waste storage or disposal. The bottom outlet is also used to drain fused salt containing bred $U^{233}$, as UCl₃, which is transferred to $U^{233}$ storage. BiCl₃ and salt mixture (KCl-NaCl) are added to the vessel in molten form via an inlet 147 in the cover 143 of the vessel. A second inlet fitting 148 in the cover 143 is provided for the introduction of helium as may be required for positive displacement of molten materials to storage or disposal facilities (not shown).

All fluid metal and fused salt inlets and outlets to the processing vessels are preferably controlled by freeze valves, and transfer of liquids is by gravity flow or by displacement by enert gas.

Starting up and operating the reactor of the invention will be described for purposes of illustration, reference being had to the drawings.

Figure 3:
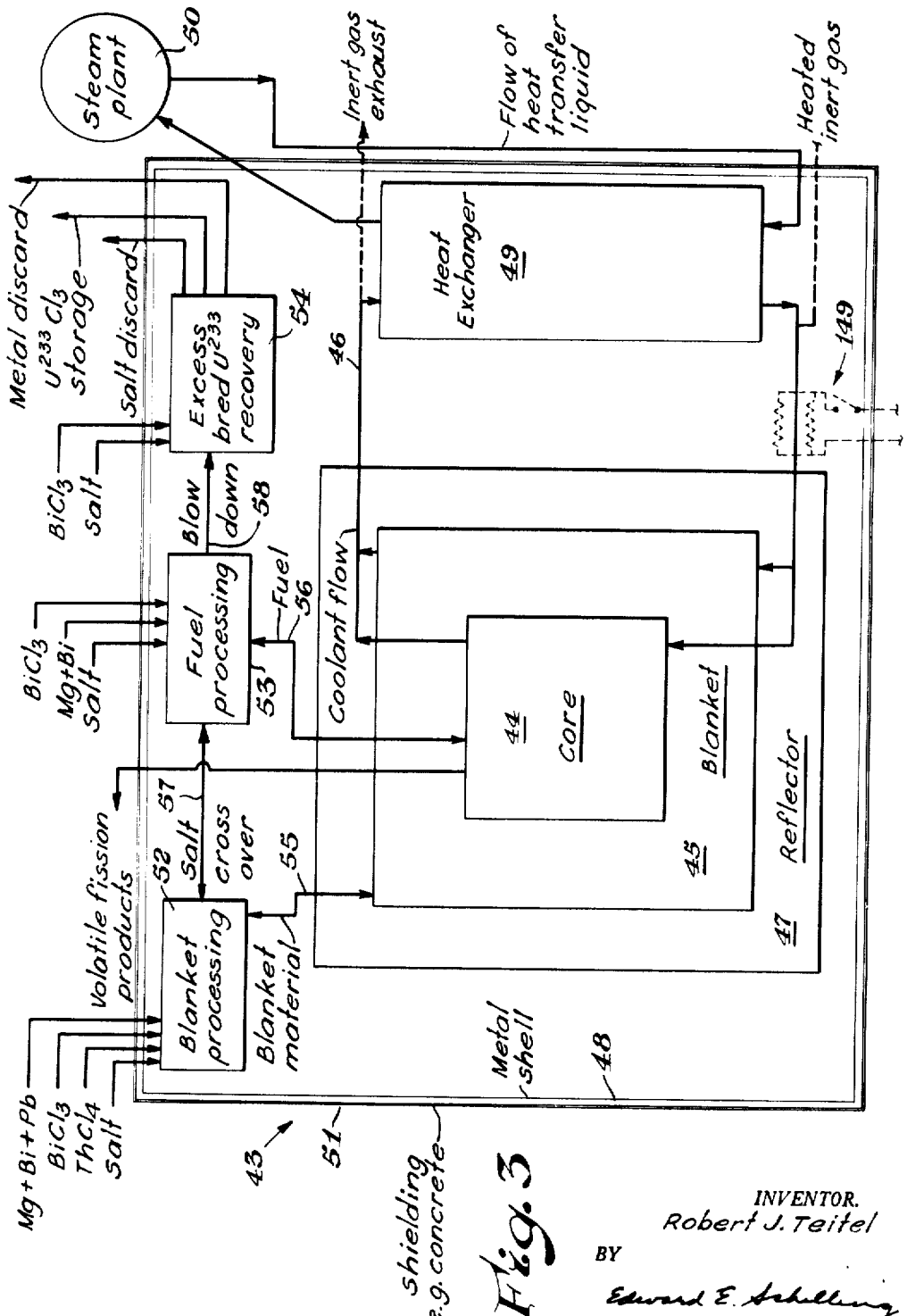
FIG. 3 is a diagrammatic largely schematic view of the reactor and associated processing equipment showing the reactor in vertical section.

Referring now more particularly to FIGS. 3 and 8, the reactor is initially constructed and the fuel elements 78 put into place, generally with the fuel already in the lower reservoir region in each element. Liquid metal coolant is not put into the coolant lines 46 and passageways 74, 79 until after the core region 44 is heated. Heating is carried out by flowing warm helium through the coolant system, and then gradually increasing the temperature of the helium until the core block is well above the melting point of the metal coolant. In the event lead is used as the coolant liquid, the temperature of the core must be above 327° C. Thus on bringing the core to about 350 to 400° C., molten lead or other suitable coolant can be introduced into the coolant system. At the same time, the fuel in the fuel elements will be in molten form, as bismuth melts at about 271° C. Coolant is circulated until the fuel is heated above solution temperature. Then the plungers are depressed to move the fuel into critical configuration. The resulting fission then generates heat as designed. If desired, supplemental heating means 149 may be placed around the coolant lines, e.g., on the return side of the heat exchanger, so that the coolant liquid can be kept hot if there is an extended but not permanent shutdown of the nuclear reaction in the core. Or, the heat exchanger 49 may be operated in reverse by supplying high pressure steam or other hot fluid thereto. Generally, the core region has sufficient heat capacity to stay hot for a period of several hours or more, and once the reactor has been in operation for a month or more, accumulated fission products in the core and portoactinium in the blanket continue to generate substantial heat even when the reactor is sub-critical. The reactor is made critical and brought into steady state operation on bringing in helium by the pneumatic lines 79 connected to the top of the fuel element covers. The helium depresses the pistons which in turn force the plungers into the fuel element reservoir (as shown more particularly in FIG. 12), bringing the fuel into critical configuration. Upon bringing all or most of the fuel elements into the "reactor on" position, the fuel in each fuel element becomes suitably disposed with respect to surrounding fuel elements and intermediate moderator material that the reactor becomes critical.

The blanket has been previously filled with blanket material consisting of a dispersion of thorium intermetallic compound in bismuth-lead alloy, preferably $ThBi_2$ in bismuth-lead alloy containing 4 parts of lead per part of bismuth. The blanket material rises by convection or gas lift in the vertical passageways 83 closest to the core region, spreads out through the upper horizontal tank section 85 and flows downwardly through the vertical passages farthest from the core region. The movement is slow enough that the blanket material in the horizontal tank section at the side 150 farthest removed from the core region is substantially free of solid thorium compound. On admitting helium under pressure through the inlet in the cover of the horizontal tank section, substantially solid-free blanket material is forced up through the tube to the blanket processing vessel. One-tenth of the blanket material is tranferred daily in this manner for a reactor being operated on a 10-day processing cycle. Thus, in a blanket sector employing 12,500 pounds of blanket material in each sector, 1,250 pounds (about 2 cubic feet) of liquid blanket metal is processed per cycle.

Referring more particularly to FIG. 14, the metal from the blanket section enters the processing vessel via the inlet 87 in the lower half of the vessel and is contacted with fused chloride salt mixture 113, which may be admitted initially via the inlet 115 in the cover 112 of the vessel, but in steady state operation, is admitted via the centrally disposed tube 111 bringing salt through the salt crossover 57 from the fuel processing vessel, i.e., the same salt is used in both processing vessels, except for blowdown losses. Bismuth chloride in admixture with salt medium is admitted to the processing vessel via the said inlet 115 in the cover of the vessel and reacts with oxidizable fission products, uranium 233, and thorium present in the blanket metal. On admitting helium pressure via the inlet 114 in the cover of the vessel, the fused salt 113, now containing the chlorides of the metals oxidized out of the liquid blanket 118 metal is displaced up through the tube 111 and forced over into the fuel processing vessel 53 via the salt crossover tube 57.

Referring now more particularly to FIGS. 15 and 16 in connection with FIG. 12, helium pressure admitted to the fuel elements via the inlet tube 80a connected to the cover 101 below each piston 98 forces the fuel into the side passageway 102 formed in the fuel element sidewall and from the side passageway into the tube 81 leading to the fuel processing vessel. At the same time the pressure above piston 98 is increased to assure that that the plunger remains in a depressed position during fuel extraction. Each tube 81 is connected to its respective cup 128 in the fuel processing vessel. Initially, the fuel elements are each charged with about 1,700 cubic centimeters of liquid metal fuel, generally consisting of about 0.5 weight percent uranium 233 in bismuth. Of this fuel charge, 170 cubic centimeters is removed from each fuel element daily on the 10-day processing cycle. The 170 cc. of fuel, transferred to each cup via the tube 81 and the connecting passageway 129 through the lower section of the fuel processing vessel, mixes with the heel of bismuth metal normally retained in each cup below the connection of the small passageway 129 with the individual cup.

It is important that both the size of the cups and the quantity of fuel brought into the cups are selected so that each cup is made level full to the floor 126 of the processing vessel on bringing up the daily quantity of fuel to be processed.

Salt brought over through the salt crossover tube 57 from the blanket processing vessel contacts the fuel at the floor level, i.e., salt-medium interface. Oxidizable fission products in the fuel reduce part of the uranium chloride and thorium chloride present and enter the salt phase, thus substantially freeing the fuel in each cup of oxidizable fission products. The requisite amount of magnesium-bismuth alloy is added through the centrally disposed delivery tube 133 extending downwardly from the cover 125 of the fuel processing vessel. The magnesium reacts with substantially all of the remaining uranium chloride and thorium chloride reducing the salts to uranium and thorium metal. The bismuth added as magnesium-bismuth alloy adds to the volume of the fuel which then covers the floor of the fuel processing vessel and the opening 137 to each fuel cup. The uranium reduced from the salt phase diffuses into the fuel in each cup and replaces "burned up" uranium. The thorium formed by reduction diffuses into the fuel and precipitates as thorium-bismuth intermetallic compound.

On dropping the temperature of the fuel processing vessel from 550 or 600° to about 450° C., part of the noble fission products present in the fuel cups precipitates or separates as a solid particulate bismuth compound and rises to the top of the bismuth metal fuel layer. The freeze valve 151 controlling the fluid outlet 136 at the floor level 126 of the fuel processing vessel is then warmed to permit the passage of molten salt and metal and helium pressure is applied via the gas inlet 130 in the cover of the processing vessel to force out "blowdown." The "blowdown" consists of the shallow fuel layer lying just above the opening to each fuel cup, and about one-tenth or more of the salt mixture 138. The blow down material is transferred to radioactive waste storage or to uranium 233 recovery, as desired. The flow of blow down material is halted by again cooling the freeze valve 151 effectively closing the fluid outlet 136 at the floor level of the processing vessel.

The fuel processing vessel is then permitted to warm up to the saturation temperature for the fuel composition used in the reactor, usually 550 to 600° C. While the thorium which has entered the fuel metal is precipitated and lies settled as thorium bismuthide at the bottom of the respective fuel cups, the freeze valves 82 (shown in FIG. 8) controlling the fuel flow lines 81 are brought to a temperature at which bismuth flows through the freeze valves but salt is effectively stopped, the salt freezing to form a restrictive solid plug. Generally, a temperature of 325° C. is suitable. On transmitting helium pressure by the inlet 130 in the cover of the processing vessel, fuel is forced out of the respective cups via the respective passages 129 and fuel lines 81 back to the individual fuel elements. As soon as the fused salt level falls to the point that it enters the respective passageways and fuel flow lines and reaches the freeze valves 82, the salt freezes and stops delivery of fuel to each fuel element.

Make-up thorium chloride admixed with make-up inorganic salt medium, the latter to make up for blowdown, and sufficient bismuth chloride to oxidize the settled thorium and alloyed uranium in the liquid metal "heel" in each fuel cup are added to the fuel processing vessel via the salt inlet 131 in the cover of the fuel processing vessel. If desired, the make-up thorium chloride and make-up salt medium may be added to the blanket processing vessel instead. The resulting fused salt mixture, upon being displaced by helium, enters the depending salt inlet 132 and goes back through the salt crossover tube 57 to the blanket processing vessel.

In the blanket processing vessel, as shown in FIG. 14, magnesium-bismuth-lead alloy is admitted to the vessel via the inlet 116 extending through the sidewall of the vessel. The make-up thorium chloride in the transferred salt is reduced by the magnesium to thorium metal which forms thorium bismuthide in the blanket thorium metal 118 and alloys therewith. The blanket liquid metal, now relieved of part of its load of uranium 233 and fission products and replenished with make-up thorium, is returned to the side blanket region via the drain 119 at the bottom of the processing vessel and the connecting tube 89 to adjacent the bottom 84 of the vertical blanket passage farthest removed from the core region, as shown in FIG. 8. There the processed blanket material mixes with the retained blanket material until the next daily cycle begins, generally 12 to 15 hours later.

In the core section, the rejuvenated fuel is mixed with unprocessed fuel in each fuel element. In one manner of carrying out mixing so as not to halt operation of the reactor, the individual fuel element plungers are individually raised and lowered several times in a random pattern using the pneumatic controls. This results in a mixing of the rejuvenated fuel with that retained in each fuel element. The fuel is then generally left undisturbed for about 12 to 15 hours or until the next processing cycle begins.

The control of gaseous fission products is maintained by circulating the helium used for pressurizing the fuel elements and processing tanks through an appropriate charcoal absorption trap. There the rare gas fission product gases Xe, Kr and the like are removed on the solids surface. The purified helium is compressed and stored for further use. The trapped fission products are permitted to decay and, when safe, desorbed by heating. This operation is carried on continuously by a system of two or more traps in parallel. Each trap in turn when filled is isolated and reactivated so that there is one trap on the line at all times.

It is contemplated that once the reactor is operating in a steady state and the processing cycles are well established, the amount of bismuth chloride added to the blanket processing vessel and the amount of fuel blowdown can be regulated according to the total neutron flux in the core region and fine individual measurements of concentrations of materials at each processing step is not necessary.

Preferably the range of operating temperatures in the various parts of the reactor during operation are as follows:

| Part: | Temperature, °C. |
|---|---|
| Core, up to | 1000 |
| Blanket | 550–700 |
| Fuel processing vessel | 400–550 |
| Blanket processing vessel | 550–600 |
| Uranium recovery vessel | 550–600 |
| Coolant | 550–650 |

*Example*

As an example illustrative of the process of the invention, a breeder reactor fueled with liquid metal fuel and designed to produce 200 megawatts of heat is subjected to semicontinuous integrated fuel-blanket processing. The reactor is provided with 455 kilograms (1,000 pounds) of fuel metal in each of 8 sectors. The fuel consists of 0.5 percent by weight of the uranium isotope $U^{233}$ in bismuth. The reactor is also provided with 5,700 kilograms (12,500 pounds) of blanket liquid metal in each of 8 sectors. The blanket liquid metal consists of a dispersion of $ThBi_2$ particles in molten lead-bismuth alloy.

The dispersion on standing settles into two layers: substantially solid-free liquid metal and settled dispersion, having the following compositions at equilibrium:

| Solid-free liquid metal: | Settled dispersion |
|---|---|
| 80 percent Pb | 44 percent Pb. |
| 20 percent Bi | 41 percent Bi. |
| 0.01 percent $U^{233}$ | 0.01 percent $U^{233}$. |
| 0.01 percent Th | 15 percent Th. |

Blanket liquid metal from each sector is processed as follows:

570 kilograms (1,250 pounds) of solid-free liquid metal, having a temperature of about 550° C. is transferred by displacement with helium gas, from the blanket area to the blanket processing vessel for that sector. In the processing vessel, the liquid metal is brought into intimate contact with about an equal volume of a fused salt mixture weighing 108 kilograms. The salt mixture consists of KCl and NaCl in weight proportions of about 1:1, and a small amount of $MgCl_2$ (less than about one percent). 143 grams of $BiCl_3$ is added to the salt to oxidize the thorium (57 grams) in the liquid metal to $ThCl_4$, and 29.5 grams of bred $U^{233}$ (51.8 percent of that present) to $UCl_3$. The reaction takes place at a temperature of 580° C.

The fused salt mixture containing bred $U^{233}$ as the chloride is transferred by positive displacement with helium gas from the blanket processing vessel to the fuel processing vessel. The fuel processing vessel is provided with 25 individual cups projecting downwardly from the bottom thereof and communicating with the vessel. The vessel contains one cup per fuel element in the sector. Each cup has a volume of 190 cc. An amount of fuel having a volume of 170 cc. (10 percent of fuel charge per element) is transferred to each cup and mingles with 20 cc. of residual bismuth metal therein. The fuel processing vessel is held at about 550° C. while the $UCl_3$ in the salt phase oxidizes 0.3 gram of oxidizable fission product to the chlorides in each cup. 250 cc. of bismuth containing 13.7 grams of magnesium is added to the fuel processing vessel at a temperature of about 550° C. and completes the reduction of the chlorides of $U^{233}$ and thorium. The temperature of the fuel processing vessel is dropped to 400° C., and 0.4 gram of noble fission products separate as solid bismuthide intermetallic compounds in each cup, and floats to the metal-salt interface. The bismuth added with the magnesium causes the floating noble fission products to float out of the cups and onto the floor of the vessel.

The rejuvenated fuel in each cup is transferred back to its respective element via respective flow means. A salt trap freeze valve in each flow line is regulated to a temperature at which it stops the flow of liquid metal from the cup when fused salt enters the line by the formation of a solid salt plug, and thus a measured amount (170 cc.) of molten bismuth alloy is delivered to each fuel element. 20 cc. of bismuth alloy containing settled $ThBi_2$ remains in each cup.

A mixture of 500 cc. of make-up KCl-NaCl and 107.5 grams of $BiCl_3$ is added to the fuel processing vessel to oxidize the 57 grams of Th present as $ThBi_2$ in the cups in the vessel, and the 3 grams of uranium also present in the residual bismuth, to the respective chlorides which enter the salt phase.

The salt phase in the fuel processing vessel, except for that in the cups, is transferred by positive displacement with helium to the blanket processing vessel and contacts the previously extracted blanket metal therein. 40 grams of make-up $ThCl_4$ is added to the salt. The temperature of the blanket processing vessel is maintained at 600° C., while 17.7 grams of magnesium are added to the vessel as 200 grams of molten magnesium-bismuth-lead alloy. The proportion of bismuth and lead are one part of bismuth per four parts of lead. The magnesium reacts with $ThCl_4$ and $UCl_3$ in the salt, reducing each to the metal which alloys with the bismuth-lead, and, in the case of thorium, may precipitate therein to a slight extent. The bismuth-lead alloy is then returned to the blanket zone and permitted to mix with the molten liquid metal there for 12 to 15 hours before transferring another one-tenth portion to the processing blanket processing vessel on a 10-day processing cycle.

The bismuth alloy and salt-blown-down mixture transferred to the uranium recovery vessel is treated along with the blow down from seven other sectors to recover about 10 grams of bread $U^{233}$ as follows:

The salt layer containing oxidized fission products is separated (decanted) from the liquid metal and discarded to radioactive waste disposal. 13.5 grams of $BiCl_3$ mixed with about 1,000 grams of KCl-NaCl is added to the vessel and brought into contact with the liquid metal at a temperature of about 580° C. The $U^{233}$ in the liquid metal is oxidized to $UCl_3$ and enters the fused salt layer. Noble fission products remain in the bismuth alloy. The metal phase is drained and discarded to radioactive waste disposal. The salt phase is drawn off and transferred to excess bred $U^{233}$ storage.

Among the advantages of the present reactor are the simplicity in design in avoiding the necessity for pumps and mechanically actuated parts in the regions of high neutron flux, and in the compactness of the integrated processing system.

The invention having been thus broadly described, many modifications thereof will be obvious to one skilled in the art and the breadth of the invention is to be considered limited only by the scope of the appended claims.

I claim:

1. A liquid metal fuel breeder reactor having physically associated therewith within a shielded area an integrated fuel-blanket processing system for removing nuclear poisons from the fuel and for transferring bred uranium 233 from the blanket to the fuel which comprises: a core region provided with liquid metal-containing fuel elements, at least one control element, and moderator material; a blanket region having therein a solid thorium compound dispersion in a liquid metal, said blanket region extending around the core region and being adjacent thereto; controllable means for transferring such substantially solid-free liquid metal from the blanket region to an enclosed blanket processing vessel; means for transferring into the blanket processing vessel respectively liquid metal from the blanket region, magnesium-liquid metal alloy, and inert gas; controllable means for discharging fused salt from the blanket processing vessel to an enclosed fuel processing vessel; said enclosed fuel processing vessel comprising an upper tank section having side walls, a cover and a floor, and a lower section having a plurality of elongated cups extending downwardly from the floor of the tank section, each of said cups having side walls, an enclosed bottom, and an open top communicating with the floor of the tank section; controllable fluid flow means for transferring liquid metal from fuel elements in the core region to respective cups in the processing vessel; freeze valves associated with said flow means and adapted to control fluid flow therethrough; controllable fluid inlets extending through the cover of said fuel processing vessel and adapted to admit respectively magnesium-liquid metal alloy, helium and fused salts to the interior of the processing vessel; a controllable fluid outlet extending through the side wall of said fuel processing vessel at about the floor level of the upper tank section and communicating with radioactive waste disposal means; controllable means for transferring fused salts from the fuel processing vessel to the blanket processing vessel; and controllable means for transferring thorium-containing liquid metal from the blanket processing vessel to the blanket region.

2. The reactor as in claim 1 in which the blanket region consists of at least one quiescent zone, at least one hotter zone and at least one cooler zone, said hotter zone being disposed closer to the core region and said cooler zone being disposed farther from said core region, and said reactor including: means for passing a coolant liquid through the core and blanket regions in intimate heat exchange relation and through a heat exchanger adapted to remove heat from the coolant and generate steam; means for transferring said steam to an electric generator; and a neutron reflector surrounding said blanket region.

3. In the method of operating a liquid metal fuel breeder reactor in conjunction with an integrated fuel-blanket processing system within a shielded area, said reactor employing uranium 233 in bismuth as fuel, and, as blanket, thorium compound dispersed in a liquid metal selected from the group consisting of bismuth and bismuth-lead alloy, said reactor being operated continuously and maintained in a steady state condition with respect to total neutron flux and total quantity of uranium 233 in the fuel in the reactor while carrying out the integrated fuel-blanket processing in conjunction with the operation of the reactor, the sequence of steps which comprises: contacting spent liquid fuel with a fused salt mixture in a fuel-salt contacting zone, said fused salt mixture consisting essentially of alkali metal chlorides and the chloride of uranium 233; adding the requisite amount of liquid magnesium-bismuth alloy to reduce the chloride of uranium 233 to uranium, said uranium alloying with the liquid metal fuel; holding the liquid metal fuel at a temperature below about 500° C., whereby noble fission products form solid particles which float in the upper part of the liquid; and blowing down part of said fused salt mixture and the upper part of said liquid metal fuel containing said solid particles which float therein.

4. In the method of operating a liquid metal fuel breeder reactor in conjunction with an integrated fuel-blanket processing system physically associated with the reactor within a shielded area, said reactor employing uranium 233 in bismuth as fuel in the core region, and, as blanket, in the blanket region, thorium compound dispersed in a liquid metal selected from the group consisting of bismuth and bismuth-lead alloy, said integrated fuel-blanket system including a blanket metal-salt contacting zone, a fuel-salt contacting zone, and uranium 233 recovery and waste disposal means, said reactor being operated continuously and maintained in a steady state condition with respect to total neutron flux and total quantity of uranium 233 in the fuel in the reactor while carrying out the integrated fuel-blanket processing in conjunction with the operation of the reactor, the sequence of steps which comprises: transferring substantially solid-free neutron irradiated blanket metal containing bred uranium 233 from the blanket region of the reactor to the blanket metal-salt contacting zone; contacting the blanket metal with a fused salt mixture consisting essentially of alkali metal chloride and an amount of bismuth chloride which is critically insufficient to convert all the uranium 233 in the blanket metal to the chloride; separating the fused salt mixture from the blanket metal; transferring the fused salt mixture and spent fuel concurrently to the fuel-salt contacting zone; contacting the fused salt mixture with the fuel; adding molten magnesium-bismuth alloy to the fused salt-metal mixture in the requisite amount to reduce substantially all the chloride of uranium 233 present in the salt mixture; adjusting the temperature of the fuel-salt contacting zone whereby noble fission products in the fuel float in the fuel and thorium and uranium present in amounts exceeding the solubility limits in the fuel metal settle out; blowing down to uranium 233 recovery and waste disposal means a mixture consisting of the upper layer of liquid metal fuel and part of the fused salt mixture in the fuel contacting zone; separating the liquid metal fuel from settled precipitates and the fused salt within the fuel contacting zone; transferring the separated liquid fuel to the core region of the reactor; transferring the fused salt from the fuel-salt contacting zone to the blanket metal-salt contacting zone; adding make-up $ThCl_4$ and magnesium-bismuth metal alloy to the fused salt; separating the blanket material from the fused salt; transferring the blanket material back to the blanket region of the reactor; and repeating all of the foregoing steps periodically, successively and respectively.

5. In the method of operating a liquid metal fuel breeder reactor in conjunction with an integrated fuel-blanket processing system within a shielded area, said reactor having a core region employing liquid metal fuel containing uranium 233 and a blanket region employing thorium compound dispersion in liquid metal, said core region comprising a plurality of sectors, each having physically associated and coordinated therewith an integrated fuel-blanket processing system including a blanket metal-salt contacting zone and a fuel-salt contacting zone, said reactor being provided with at least one uranium 233 recovery and waste disposal means, said reactor being operated continuously and maintained in a steady state condition with respect to total neutron flux and total quantity of uranium 233 in the fuel in the reactor while carrying out integrated fuel-blanket processing in conjunction with the operation of the reactor, the sequence of steps which comprises: in the core region of the reactor providing an amount of uranium 233 in the fuel which is in excess of the amount of uranium 233 required for criticality, said uranium 233 being disposed collectively in said plurality of sectors; and carrying out the following steps in substantially each sector: transferring substantially solid-free neutron irradiated blanket metal containing bred uranium 233 from the blanket region of the reactor to the blanket metal-salt contacting zone; contacting the blanket metal with a fused salt mixture consisting essentially of alkali metal chloride and an amount of bismuth chloride which is critically insufficient to convert all the uranium 233 in the blanket metal to the chloride; separating the fused salt mixture from the blanket metal; transferring the fused salt mixture and a portion of spent fuel concurrently to the fuel-salt contacting zone, said portion of spent fuel being insufficient to destroy criticality of the core region on removing such portion from substantially each sector; contacting the fused salt mixture with the fuel; adding molten magnesium-bismuth alloy to the fused salt-metal mixture in the requisite amount to reduce substantially all the chloride of uranium 233 present in the salt mixture; adjusting the temperature of the fuel-salt contacting zone whereby noble fission products in the fuel float in the fuel and thorium and uranium present in amounts exceeding the solubility limits in the fuel metal settle out; blowing down to uranium 233 recovery and waste disposal means a mixture consisting of the upper layer of liquid metal fuel and part of the fused salt mixture in the fuel contacting zone; separating the liquid metal fuel from settled precipitates and the fused salt within the fuel contacting zone; transferring the separated liquid metal fuel to the core region of the reactor; transferring the fused salt from the fuel-salt contacting zone to the blanket metal-salt contacting zone; adding make-up thorium chloride and magnesium-bismuth metal alloy to the fused salt; separating the blanket metal from the fused salt; transferring the blanket material back to the blanket region of the reactor; and repeating all of the foregoing steps periodically, successively and respectively.

6. In an integrated fuel-blanket processing system adapted to be operated in a shielded area in conjunction with a liquid metal fuel breeder reactor, said reactor including as components a core and a blanket, said core having an array of fuel elements employing as liquid metal fuel a uranium-bismuth alloy substantially free of lead, and said blanket being provided with a solid thorium intermetallic compound dispersion in liquid bismuth-lead alloy, said integrated fuel-blanket processing system including means for processing blanket metal and means for processing spent liquid metal fuel, and as a part of the means for processing spent liquid metal fuel: an enclosed processing zone for purifying and replenishing the fuel from the said nuclear reactor which comprises an enclosed vessel formed of an upper tank section having a plurality of elongated cups extending downwardly from the floor of the tank section, each of said cups having side walls, a closed bottom, and an open top communicating with the floor of the tank section; controllable fluid flow means extending through the side walls of said cups and being adapted to transferring liquid metal between fuel elements in the core region and respective said cups in the enclosed vessel; controllable fluid inlets extending through the cover of said enclosed vessel and adapted to admit respectively magnesium-liquid metal alloy, helium and fused salts to the interior of the enclosed vessel; and a controllable fluid outlet extending through the side wall of said enclosed vessel at about the floor level of the upper tank section and communicating with radio-active waste disposal means.

7. The method as in claim 4 in which: the reactor is fueled with the amount of uranium 233 required for criticality plus a predetermined excess of uranium 233 over the critical amount; the amount of uranium 233 in the spent fuel transferred to the fuel-salt contacting zone is less than the said predetermined excess; the transferred spent fuel is processed while maintaining criticality of the reactor; the so-processed fuel is returned to the core region; and the processing of amounts of spent fuel containing less than said predetermined excess of uranium 233 is carried out at the requisite frequency to maintain said predetermined excess of uranium 233.

8. In the method of continuously operating a liquid metal fuel breeder reactor within a shielded area, said reactor employing uranium 233 in bismuth as fuel in the core region, and, as blanket metal, in the blanket region, thorium compound dispersed in a liquid metal selected from the group consisting of bismuth and bismuth-lead alloy, and said reactor having physically associated therewith within the shielded area, fuel and blanket processing apparatus including a blanket metal-salt contacting zone and a fuel-salt contacting zone, the sequence of steps which comprises: transferring substantially solid-free neutron irradiated blanket metal containing bred uranium 233 from the blanket region of the reactor to the blanket metal-salt contacting zone; contacting the blanket metal with a fused salt mixture consisting essentially of alkali metal chloride and an amount of bismuth chloride which is critically insufficient to convert all the uranium 233 in the blanket metal to the chloride; separating the fused salt mixture from the blanket metal; transferring the fused salt mixture and spent fuel concurrently to the fuel-salt contacting zone; contacting the fused salt mixture with the spent fuel; adding molten magnesium-bismuth alloy to the fuel-salt mixture in the requisite amount to reduce substantially all the chloride of uranium 233 present in the salt mixture; adjusting the temperature of the fuel-salt contacting zone whereby noble fission products in the fuel float in the fuel and thorium and uranium present in amounts exceeding the solubility limits in the fuel metal settle out; blowing down a mixture consisting of the upper layer of liquid metal fuel and part of the fused salt mixture in the fuel-salt contacting zone; separating the liquid metal fuel from settled precipitates and from the fused salt within the fuel-salt contacting zone; transferring the separated liquid metal fuel to the core region of the reactor; transferring the fused salt from the fuel-salt contacting zone to the blanket metal-salt contacting zone, said transferred salt being there placed in contact with blanket metal; to the fused salt and blanket metal, adding make-up $ThCl_4$ and an alloy selected from the group consisting of magnesium-bismuth metal and magnesium-bismuth-lead metal, thereby adding make-up thorium to the blanket metal; separating the blanket metal from the fused salt; transferring the blanket metal back to the blanket region of the reactor; and repeating all of the foregoing steps periodically, successively and respectively, the reactor being maintained in a substantially steady state, continuous operating condition, with respect to total neutron flux, total quantity of uranium 233 in the fuel, and total quantity of thorium in the blanket, upon carrying out the repeated steps with the requisite frequency and upon withdrawing, in each step, the requisite amounts of fuel and of blanket to the fuel and blanket processing apparatus, said reactor and fuel and blanket processing apparatus being supplied substantially only non-fissionable materials from outside the shielded area after initial fueling of the reactor, the non-fissionable materials being magnesium, bismuth, bismuth chloride, alkali metal chloride, thorium chloride, and lead.

References Cited by the Examiner

UNITED STATES PATENTS

| | | | |
|---|---|---|---|
| 2,756,988 | 7/1956 | Tama | 266—38 |
| 2,758,023 | 8/1956 | Bareis | 176—37 X |
| 2,782,475 | 2/1957 | Wilhelm et al. | 266—38 |
| 2,910,417 | 10/1959 | Teitel | 176—14 X |
| 2,982,535 | 5/1961 | Hiskeg et al. | 266—39 |
| 2,992,982 | 7/1961 | Avery | 176—17 |
| 2,993,850 | 7/1961 | Soodak et al. | 176—17 |
| 3,000,728 | 9/1961 | Long et al. | 176—61 |
| 3,041,263 | 6/1962 | Kiehn et al. | 176—14 |
| 3,069,256 | 12/1962 | Teitel et al. | 176—88 X |
| 3,103,475 | 9/1963 | Szilard | 176—37 X |

FOREIGN PATENTS 856,946 12/1960 Great Britain.

OTHER REFERENCES

Proceedings of the Second U.N. International Conference on the Peaceful Uses of Atomic Energy, vol. 7 (1958), pp. 207–216. Vol. 10 (1958), pp. 487–499.

REUBEN EPSTEIN, *Primary Examiner.*

CARL D. QUARFORTH, *Examiner.*